(12) United States Patent
Goulon et al.

(10) Patent No.: US 11,978,327 B2
(45) Date of Patent: May 7, 2024

(54) ELECTRONIC PAYMENT DEVICE WITH MEANS FOR BLOCKING ACCESS TO A DATA STORAGE MODULE

(71) Applicant: BANKS AND ACQUIRERS INTERNATIONAL HOLDING, Paris (FR)

(72) Inventors: Maxime Goulon, Chatuzange-le-Goubet (FR); Jérôme Andre, Montoison (FR); Alain Soubirane, Bourg-les-Valence (FR)

(73) Assignee: BANKS AND ACQUIRERS INTERNATIONAL HOLDING (FR)

( * ) Notice: Subject to any disclaimer, the term of this patent is extended or adjusted under 35 U.S.C. 154(b) by 0 days.

(21) Appl. No.: 17/918,022

(22) PCT Filed: Apr. 1, 2021

(86) PCT No.: PCT/EP2021/058589
§ 371 (c)(1),
(2) Date: Oct. 10, 2022

(87) PCT Pub. No.: WO2021/204658
PCT Pub. Date: Oct. 14, 2021

(65) Prior Publication Data
US 2023/0126812 A1   Apr. 27, 2023

(30) Foreign Application Priority Data

Apr. 10, 2020  (FR) ..................................... 2003657

(51) Int. Cl.
*G07G 1/12* (2006.01)

(52) U.S. Cl.
CPC ..................................... *G07G 1/12* (2013.01)

(58) Field of Classification Search
None
See application file for complete search history.

(56) References Cited

U.S. PATENT DOCUMENTS

2004/0255141 A1* 12/2004 Hodder ................ G06Q 40/123
711/163

FOREIGN PATENT DOCUMENTS

| EP | 2824619 B1 | 7/2014 |
| EP | 2800073 A1 | 11/2014 |
| WO | 2016086968 A1 | 6/2016 |

* cited by examiner

*Primary Examiner* — Kristy A Haupt
(74) *Attorney, Agent, or Firm* — Dilworth IP, LLC

(57) ABSTRACT

An electronic payment terminal including a box having a housing inside which a first removable module for storing data related to at least one transaction carried out via the terminal is arranged, the terminal also having removable features for blocking access to the first storage module and an authenticity device covering at least one portion of the removable features for blocking access to the first storage module.

7 Claims, 10 Drawing Sheets

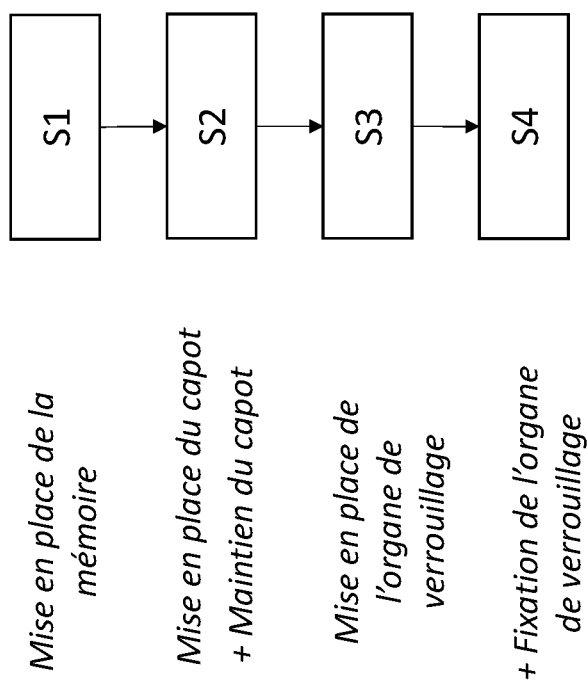

ELECTRONIC PAYMENT DEVICE WITH MEANS FOR BLOCKING ACCESS TO A DATA STORAGE MODULE

1. FIELD OF THE INVENTION

The field of the invention is that of payment devices, and in particular of mobile electronic payment terminals.

2. BACKGROUND OF THE INVENTION

Currently, payment terminals are mainly used to allow the payment of purchases of goods and services at points of sale. These terminals generally comprise a smart card reader and/or a magnetic card reader. They also comprise a screen, used in particular to display information, such as the transaction amounts, and a keypad to enter these amounts as well as to enter customer confidential codes, or a touch screen.

The most recent terminals are connected to cash registers and/or computers via a communication network. Such connections can be wired, for example of the Ethernet type, or wireless. These connections are used for example to connect to an authentication server or a bank server to obtain a debit authorisation.

For example, when connected to a cash register, the payment terminal transmits the data of the operation made to the cash register (if it is a smart cash register). This cash register saves in a log the payment transactions (whether transactions made via the payment terminal, transactions by cheque or transactions in cash). However, such a cash register sometimes does not work or does not work properly. Fortunately, this does not block the payment made on the payment terminal. However, payment logging may be incorrect, which can cause problems, for example to the authorities responsible for collecting the tax debts. In addition, unscrupulous merchants can make cash registers inoperative for the sole purpose of defrauding the authorities responsible for collecting the tax debts. These practices have been observed in particular in certain countries where the tax burden is not easily accepted. Amongst the existing solutions aimed at preventing this type of fraud, the most widespread solution consists in including, inside the electronic payment terminal, a cumulative storage module to store data concerning the transactions made. This cumulative storage module is designed such that the data it contains cannot be deleted. This data, logged in the cumulative storage module, corresponds for example to the amounts of the transactions made during the day by the merchant, together with the corresponding amounts of VAT (Value Added Tax) or of any other applicable tax.

It is also known to secure or prevent any access to the cumulative storage module, and to the data it contains, by placing it in a housing formed in a secured chamber inside the electronic payment terminal and by blocking the housing, after inserting the cumulative storage module, by permanent (or irreversible) blocking means, such as a resin.

Such a solution effectively protects the cumulative storage module and guarantees the integrity of the data it contains.

Nevertheless, certain national regulations require, in addition to the cumulative storage module permanently built into the electronic payment terminal, the implementation of a second storage module. More precisely, unlike the cumulative storage module which is configured to log only the daily VAT total information and the number of transactions made, the second storage module is configured to log all the data contained on a receipt. In other words, for a given transaction, the second storage module logs more data than the cumulative storage module. This means that the second storage module is saturated more quickly than the cumulative storage module. Consequently, the national regulations require that this second storage module, located in a non-secured chamber of the electronic payment terminal, must be configured to be removable (or extractable) so that a saturated second storage module can be replaced by a virgin second storage module.

However, such regulations generate requirements to protect the integrity of the data contained in the removable storage module.

Since the removable storage module is located in a non-secured chamber of the electronic payment terminal, a malicious person can easily extract this removable storage module to try to access the data it contains in order to modify it.

In addition, after extracting the removable storage module, a malicious person, having access to tracks coupled to the main processor of the electronic payment terminal motherboard, could also attempt to corrupt the operation of the tax part of this terminal, in particular by using a malicious device and/or software.

There is therefore a need for technical solutions which guarantee the protection of a removable storage module, at least when it is located in a non-secured chamber of the electronic payment terminal while complying with some national regulations.

3. SUMMARY OF THE INVENTION

The proposed technique relates to an electronic payment terminal comprising a box having a housing inside which a first removable storage module for storing data related to at least one transaction made via the terminal is arranged, the terminal further having removable blocking means for blocking access to the first removable storage module and an authenticity device covering at least one portion of the removable blocking means for blocking access to the first removable storage module.

The implementation of such a combination of removable blocking means and of an authenticity device provides simplified access to the removable storage module, and to the data it contains, while proposing a high level of protection for this data. This solution is in particular highly advantageous for the authorities responsible for collecting the tax debts, which use the transaction data stored in the electronic payment terminals and which require that this data cannot be falsified. Thus, thanks to the proposed technical solution, as soon as the removable blocking means and the authenticity device are assembled to the electronic payment terminal, the authenticity device must be destroyed to attempt to extract the removable blocking means for blocking access to the removable storage module in order to access the removable storage module itself.

In this way, by checking the physical state of the authenticity device (presence, absence, damage, etc.), the authorities responsible for collecting the tax debts can easily identify an electronic payment terminal for which a fraudulent attempt has been made to access its removable storage module. According to a special embodiment, the removable blocking means comprise:

- a removable cover for closing the housing to prevent access to the removable storage module, and
- a removable locking member configured to lock the removable cover in the closed position, the locking member being attached to the box by reversible attachment means.

Such a structure of blocking means, of simple design, effectively protects the removable storage module. The implementation of a plurality of elements makes it more difficult to access the removable storage module. In addition, such removable blocking means do not require the use of special tools other than those generally available to the authorities.

According to a special embodiment, the authenticity device covers at least one portion of the reversible attachment means for attaching the locking member to the box. Thus, the authenticity device must first be destroyed in order to extract the reversible attachment means, and therefore access the removable tax data storage module. According to a special embodiment, the electronic payment terminal comprises a switching member for switching the operation of the terminal, the removable blocking means blocking access to the switching member.

For example, the switching member can be used to switch the payment terminal from a use mode, to make transactions, to a maintenance mode, to perform tests and updates for example.

It therefore appears that such an arrangement allows the removable blocking means to also protect access to specific functions of the payment terminal which must not be accessed by third parties.

According to a special embodiment, the box defines an inner space comprising at least one secured inner chamber, protected by intrusion detection means, and one non-secured inner chamber, the housing being located in the non-secured inner chamber. The two inner chambers are separated from each other so that a third party can freely access the non-secured inner chamber without activating the intrusion detection means, traditionally implemented in an electronic payment terminal (which would set the terminal to protected mode and therefore make it inoperative). Thus, extracting the removable blocking means and accessing the removable storage module do not disturb the operation of the payment terminal. Such a configuration is especially advantageous when the payment terminal comprises at least one tax data storage module, arranged in the secured inner chamber.

According to a special embodiment, at least one removable blocking means, called external removable blocking means, is added to the outside of the box, the authenticity device covering at least one portion of the said at least one external removable blocking means.

In other words, at least one of the removable blocking means, a locking member and a reversible attachment means for attaching it, for example, is positioned on the outer surface of a wall of the box and is at least partially covered by the authenticity device. Thus, the authenticity device can be seen from the outside of the payment terminal. Such a configuration allows the authorities responsible for collecting the tax debts in particular, to quickly identify a payment terminal which has been accessed fraudulently or for which a fraudulent attempt has been made to access the removable storage module.

According to a special embodiment, the box defines an inner space, the removable blocking means and the authenticity device being arranged in the inner space.

Such an arrangement allows the removable blocking means and the authenticity device to be entirely located in the non-secured inner space of the terminal. Consequently, when this chamber is closed, by a removable flap in particular, the removable blocking means and the authenticity device can no longer be seen.

In addition, such an arrangement removes the need for openings made on the walls of the box, which could weaken the overall structure of the payment terminal. Such an arrangement also removes the need, when no removable storage module is present in the non-secured inner chamber of the payment terminal, for means to block these openings. Thus, such an arrangement improves the protection of the payment terminal. According to a special embodiment, the authenticity device is a mechanical device such as a seal stamped with a special imprint.

By implementing such an authenticity device, during the stamping operation the seal is attached, by deformation, to the reversible attachment means, in other words to the screw head. Thus, the authenticity device must first be destroyed in order to extract the attachment screw, and therefore access the removable tax data storage module. Such a mechanical authenticity device represents a simple and effective solution to guarantee, at minimum cost, the authenticity of the assembly of the removable blocking means for blocking access to the tax data storage module.

4. BRIEF DESCRIPTION OF THE DRAWINGS

Other characteristics and advantages of the invention will appear more clearly on reading the description which follows given as a simple illustrative and non-limiting example, and referring to the attached drawings, in which:

FIG. 5 is a flowchart of the main steps of assembling the blocking means according to the proposed technique;

5. DETAILED DESCRIPTION OF THE INVENTION

For clarity purposes, the same elements have been designated by the same references on the various figures.

In addition, in this description, the orientation and positioning terms "lower", "upper", "front" and "rear" refer arbitrarily to a normal use position of a mobile electronic payment terminal, in which the terminal keypad and screen are arranged on the front and for which the keypad, arranged at least on the lower portion of the terminal, is oriented towards the user. Also, the terms "transversal" and "longitudinal" refer to directions that are respectively approximately orthogonal to the lateral sides of the terminal, and approximately orthogonal to the front and rear sides of the terminal.

5.1 General Principle

As indicated above, electronic payment terminals are known which have two modules for storing transaction data (for example transaction amounts), in other words a first module irreversibly assembled in a secured chamber of the electronic payment terminal and a second module removably assembled in a non-secured chamber of this terminal.

The inventors of this application observed that such a structure of an electronic payment terminal, and more precisely the implementation of a removable storage module in a non-secured chamber, could generate risks regarding the integrity of the data, tax data in particular, contained in this module.

By implementing a method that is not obvious, the inventors of this application identified a novel and inventive technique protecting access to the removable storage module while allowing the authorities to quickly identify a fraudulent attempt to access this removable storage module in order to access the data it contains.

The general principle of the proposed technique consists in blocking access to a housing containing a first removable storage module storing data related to the transactions made with this terminal (for example tax data), by implementing a combination of removable blocking means for blocking access to the storage module and an authenticity device covering at least one portion of these removable blocking means.

5.2 Description of an Embodiment

Figure 1:
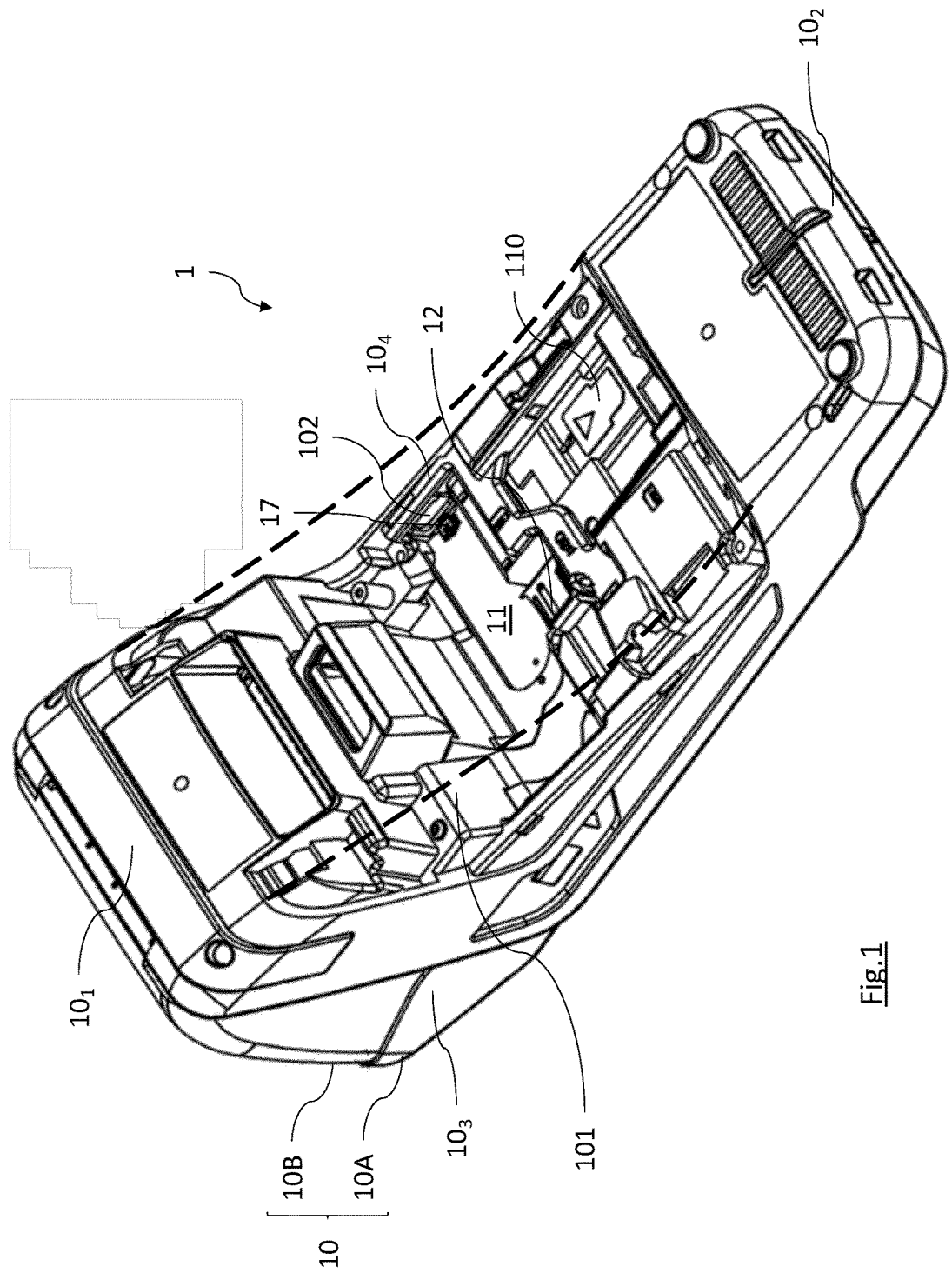
FIG. 1 is a bottom and perspective view of an example of an electronic payment terminal, not equipped with the blocking means according to the proposed technique, in order to see the storage module.

FIG. 1 is a bottom and perspective view of a mobile electronic payment terminal from which the blocking means according to the proposed technique have been extracted to see a first module for storing data (for example tax data) related to the transactions made with this terminal, and the housing in which this data storage module is arranged. Traditionally, the electronic payment terminal 1 includes a keypad with keys to enter the data, a screen to view the data, means for reading the data of the user's payment means (smart card reader, magnetic stripe card reader and/or contactless reader), and a printed circuit controlling the operation of the terminal, these elements not being shown in this patent application.

In addition, the terminal 1 comprises a box 10 defining an inner space inside which the electronic components required to operate the terminal are arranged. In a known manner, this inner space is divided into at least two separate chambers, in other words a secured inner chamber (not shown on FIG. 1) and a non-secured inner chamber 101. The secured inner chamber, which is secured by implementing intrusion detection means (not shown), contains the electronic components which must be secured, such as the printed circuit controlling the operation of the terminal in particular. It is also known that any fraudulent attempt to access this secured inner chamber sets the terminal 1 to protected mode, preventing its operation, after triggering the intrusion detection means. The non-secured inner chamber 101, which can be accessed after extracting a removable flap, contains the electronic components which do not need to be secured, such as the battery in particular. By separating the inner chambers in this way, a battery for example can be replaced without setting the payment terminal to protected mode. In addition, the terminal 1 comprises a housing 11 intended to receive a first module 12 for storing data, for example tax data, related to the transactions made with this terminal 1. It is important to note that, in this embodiment, the housing 11 is located in the non-secured inner chamber 101 of the terminal 1. Thus, the terminal 1 includes a cash register function and can even replace the cash register for accounting and tax purposes. The first storage module 12 is removable, in other words it is configured so that it can be extracted from the housing 11 without damage. The terminal 1 further comprises a switching member 17. In this embodiment, the switching member 17 is a push-button programmed to modify the operation of the terminal 1, in other words to switch the terminal 1 from a use mode to a maintenance mode, and vice versa. In this embodiment, the switching member 17 is also located in the non-secured inner chamber 101 of the terminal 1.

In addition, according to a variant, the terminal 1 contains a second module for storing data (tax data) related to at least one transaction made via the terminal. This second storage module (called cumulative storage module in paragraph 2 of this patent application) is arranged in the secured inner chamber of the terminal and is protected by permanent blocking means. Consequently, it cannot be removed.

It is important to note that the removable storage module and this second storage module are both connected to the main processor of the electronic payment terminal motherboard. The data is saved on the removable storage module and/or on the second storage module and the consistency of the data saved is guaranteed, via a dedicated computer program, by this main processor.

As shown, the box 10 comprises an upper half-shell 10A attached to a lower half-shell 10B. This lower half-shell 10B comprises the removable flap, of which only some edges are shown in dotted lines for clarity purposes, used to access the non-secured inner chamber 101 of the terminal 1.

The box 10, after joining the upper 10A and lower 10B half-shells, has several walls $10_1$, $10_2$, $10_3$ and $10_4$ defining the contours of the terminal 1.

Figure 7:
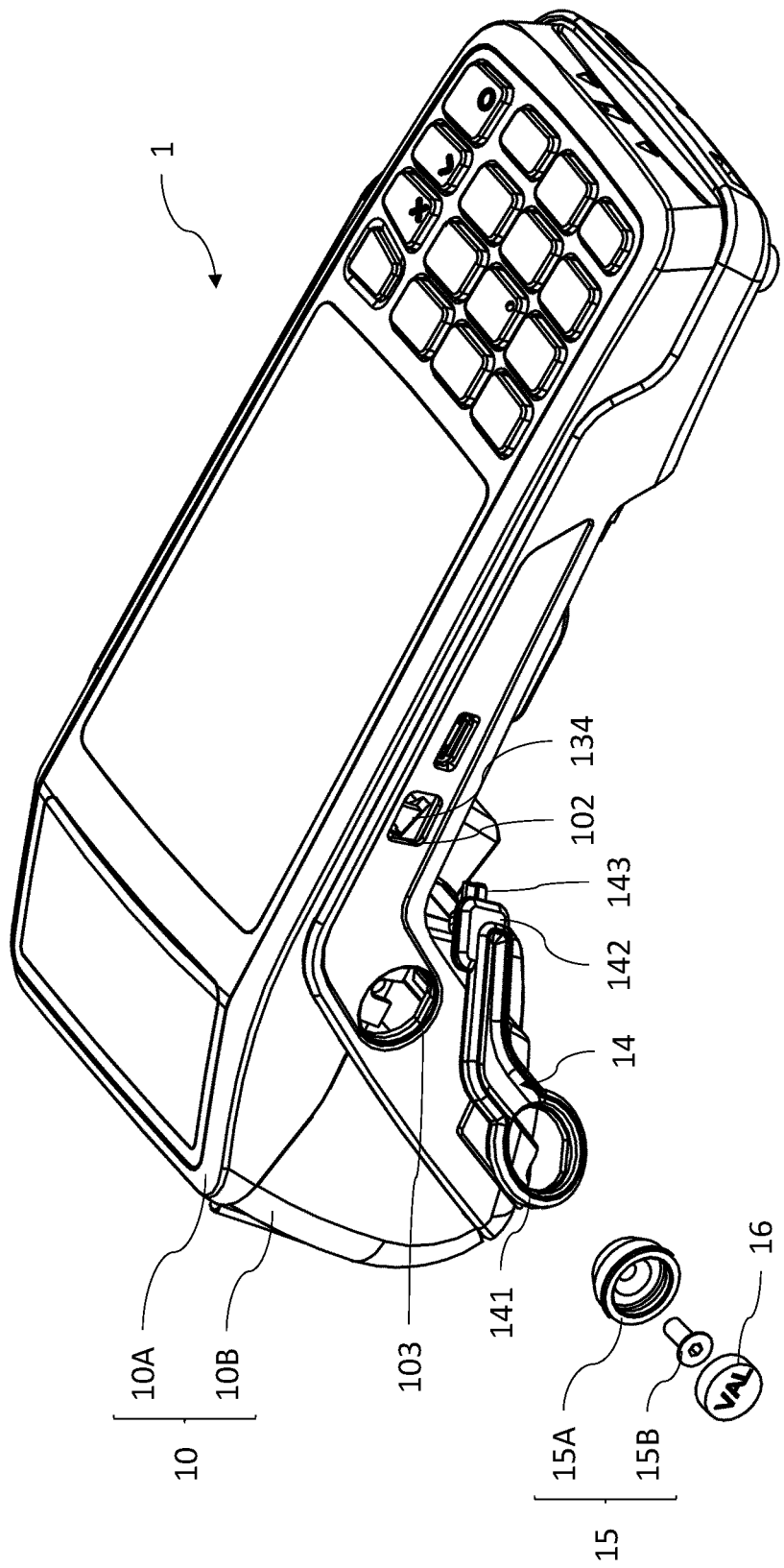
FIG. 7 shows the main assembly elements of the locking member of FIG. 4.

In addition, the box 10 has a first "locking" opening 102 and a second "attachment" opening 103, both openings being formed in a common side wall $10_4$, more visible on FIG. 7. As will be described more clearly below, the openings 102 and 103 are intended to cooperate with the means for blocking access to the first removable storage module 12.

In addition, the housing 11 receiving the first removable storage module 12 has the shape of a recess, for example "L-shaped", formed in the lower half-shell 10B inside the non-secured inner chamber 101 of the terminal 1. The housing 11 has one end located opposite the opening 102 formed in the side wall of the box 10. As detailed below, such an arrangement also helps to block access to the first removable storage module 12.

In addition, the switching member 17 is arranged in the housing 11 near the end opposite the opening 102. Thus, as described in more detail below, when the blocking means according to the proposed technique are assembled in the terminal 1, the switching member 17 cannot be accessed.

Figure 2:
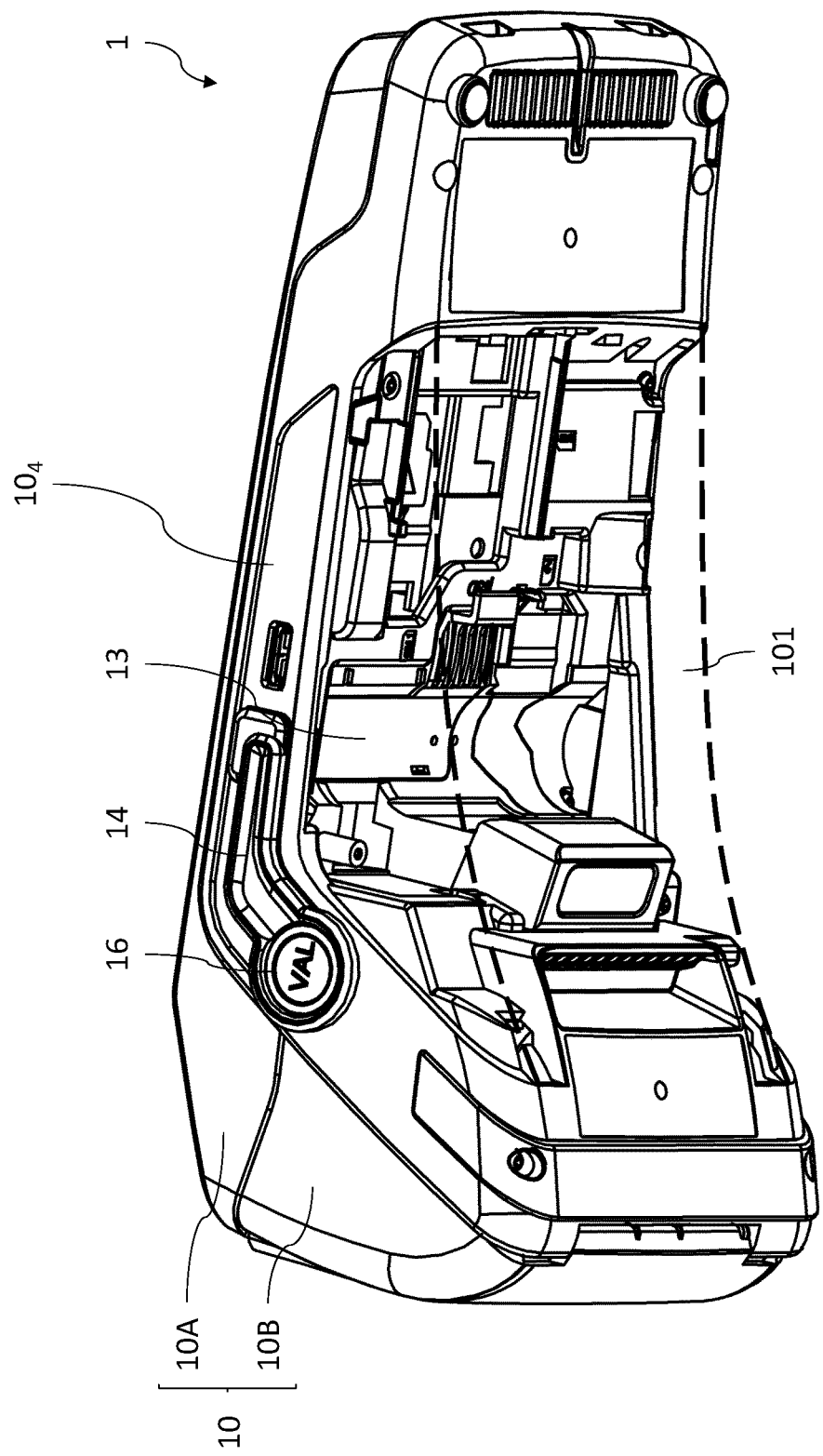
FIG. 2 is a bottom and perspective view of the electronic payment terminal of FIG. 1, equipped with the blocking means according to the proposed technique.

FIG. 2 shows the mobile electronic payment terminal of FIG. 1, on which the blocking means, according to the proposed technique, are assembled.

The blocking means 13, 14, 15 for accessing the first removable storage module 12 are removable, according to the proposed technique. It is therefore easy to extract such removable blocking means 13, 14, 15, in particular for the authorities responsible for collecting the tax debts and wanting, for example, to access the first removable storage module 12 and the data it contains.

In addition, according to another aspect of the proposed technique, the authenticity of the assembly of the removable blocking means 13, 14, 15 in the payment terminal 1 is guaranteed by applying a seal, also called authenticity device 16, covering at least one portion of the removable blocking means 13, 14, 15.

Such an authenticity device 16 can be used firstly to dissuade a malicious person from extracting the removable blocking means 13, 14, 15 to access the removable storage module 12 and, secondly, to leave an irreversible mark if such a fraudulent extraction of the removable blocking means should be carried out. During or before extraction of the removable blocking means 13, 14, 15, the authenticity device 16 must in fact be destroyed in order to access the removable storage module 12. The authorities responsible for collecting the tax debts can therefore easily identify a terminal 1 for which a fraudulent attempt has been made to access its removable storage module 12.

The proposed technique is therefore based on a special combination of the removable blocking means 13, 14, 15, of the removable storage module, and of the authenticity device 16, covering at least one portion of these removable blocking means.

According to this embodiment and as illustrated, the removable blocking means comprise a removable cover 13 for closing the housing 11 to prevent access to the first removable storage module 12.

In the closed position, the removable cover 13 covers the first removable storage module 12 arranged inside the housing 11.

The removable blocking means further comprise a removable locking member 14 configured to lock the removable cover 13 in the closed position.

The locking member 14 is added to the outside of the side wall $10_4$ of the box 10 and cooperates with the removable cover 13, via the locking opening 102.

In addition, the removable blocking means comprise reversible attachment means 15 (shown on FIG. 7) used to attach the locking member 14 to the box 10 of the terminal, via the attachment opening 103.

Figure 3A:
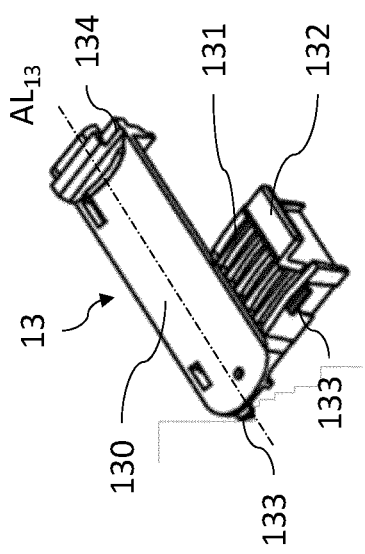
FIGS. 3A and 3B are top and perspective isolated views respectively, of a cover belonging to the blocking means according to the proposed technique.
Figure 3B:
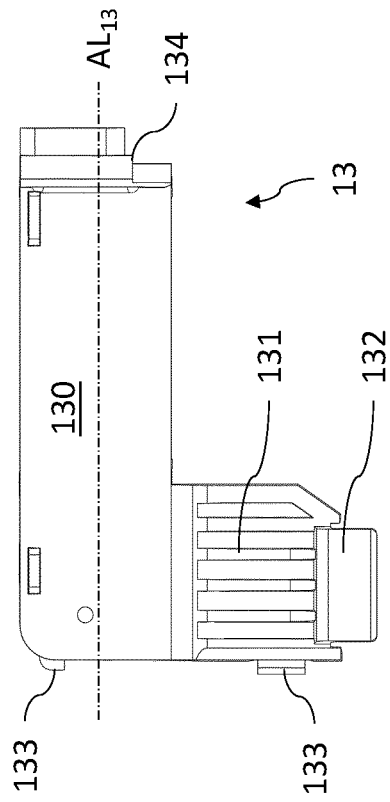

FIGS. 3A and 3B show an example of a structure of the removable cover 13 belonging to the removable blocking means according to the proposed technique, used to close the housing inside which the first storage module is arranged.

The cover 13, of shape complementary to that of the housing 11, is smaller than the housing, so that it can be inserted and extracted more easily.

As shown, the cover 13 has a flat main body 130 extending along a longitudinal axis $AL_{13}$ and a covering portion 131 configured to cover, or even go around, the first removable storage module 12. This covering portion 131 is carried by one end of the main body 130 and extends perpendicularly to the longitudinal axis $AL_{13}$ of the body. In the example shown, the covering portion 131 has a rectangular parallelepiped shape. Obviously, the shape and dimensions of the covering portion 131 are determined so as to cover the first removable storage module 12.

In addition, the cover 13 has a handling tab 132, located for example at one end of the covering portion 131.

Further, the cover 13 has retaining means 133 used to keep the cover 13, in the closed position, inside the housing 11 after insertion. The housing 11 comprises retaining means (not shown) complementary to the retaining means 133 of the cover 13. The retaining means 133 take, for example, the shape of two protuberances located at a first longitudinal end of the cover 13 and extending the cover along the longitudinal axis $AL_{13}$. Such protuberances 133 easily keep the cover 13 in the closed position in the housing 11, by sliding the cover 13 in the housing 11 until the complementary retaining means couple together.

According to this embodiment, the cover 13 has a stop 134, configured to cooperate with a portion of the locking member 14, located at a second longitudinal end of the cover 13, in other words at the end opposite that of the protuberances 133. In addition, the stop 134 extends perpendicularly to the main body 130. With such an arrangement of the stop 134, when the cover 13 is arranged in the housing 11, the switching member 17 is covered and cannot be activated.

Figure 4:
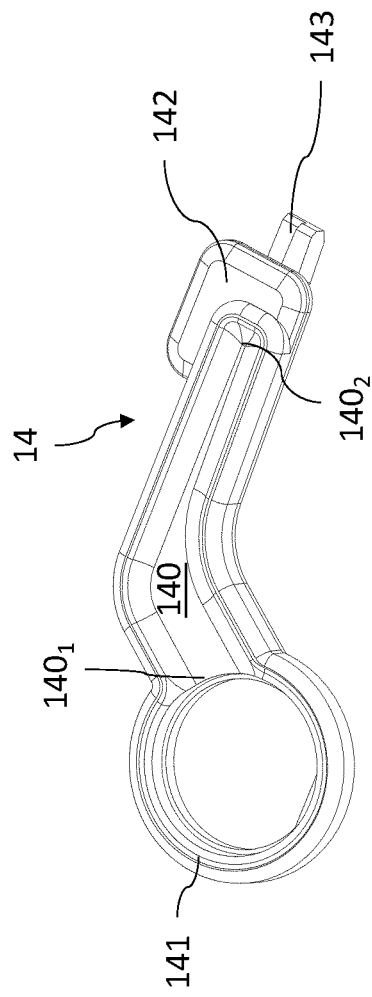
FIG. 4 is a perspective isolated view of a locking member belonging to the blocking means according to the proposed technique.

FIG. 4 shows an example of a structure of a locking member 14, belonging to the blocking means according to the proposed technique, used to lock the cover 13 when it closes the housing 11 inside which the first removable storage module 12 is arranged.

The locking member 14 has a flat main body 140 of shape matching that of the electronic payment terminal at the place where the locking member is positioned. According to one embodiment, the main body 140 is therefore substantially "L-shaped" since, seen from the side, the electronic payment terminal has a curve at this position. Traditionally, an electronic payment terminal includes in this area a print module (and in particular the paper roll which takes up a relatively large space) and is therefore thicker in its upper portion, thereby improving the ergonomics (the upper part of the electronic payment terminal is raised in use position). The main body 140 has a first end 1401, extended by an attachment ring 141 configured to receive reversible attachment means 15 (described below), and a second end 1402, extended by a hatch 142 configured to cover the opening 101 formed in the side wall of the box 10 of the terminal 1.

In addition, the hatch 142 is extended, in a parallel plane, by a lug 143 configured to keep the cover 13 in the closed position.

As will be described in more detail below, the lug 143, after having been inserted into the locking opening 102, cooperates with the stop 134 to lock the cover 13 in the closed position and therefore prevents it from moving. The lug 143 is also configured to keep the locking member 14 in position after having been attached to the box 10.

We will now describe, referring to FIGS. 5 to 8, the steps of assembling the removable blocking means for blocking access to the first storage module, described above.

Figure 8:
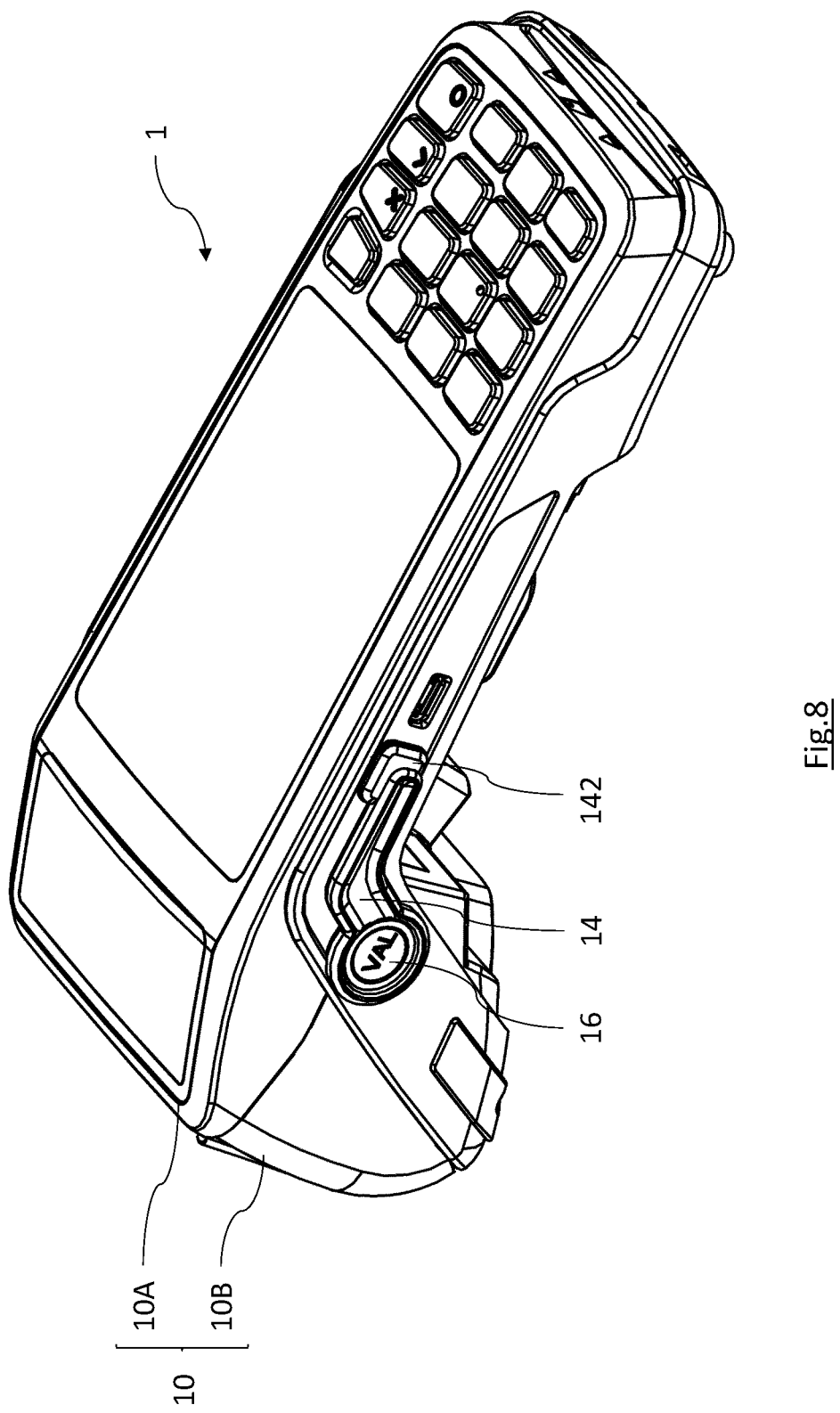
FIG. 8 is an elevated perspective view of the electronic payment terminal after assembling the blocking means according to the proposed technique.

The flowchart of FIG. 5 focuses on the main steps of assembling the removable blocking means in an electronic payment terminal. FIGS. 6 to 8 show views of an electronic payment terminal and of removable blocking means illustrating the main assembly steps, to obtain a better understanding of the proposed technique.

During a first step, referenced S1, the first removable storage module 12 is inserted inside the housing 11. To perform this step, the removable flap (not shown) of the lower half-shell 10B must first be removed.

Then, during a second step, referenced S2 and shown referring to FIGS. 6A to 6D, the cover 13 is assembled to the box 10 so as to close the housing 11 and prevent any access to the first removable storage module 12. This second step S2 comprises two sub-steps, a first sub-step of positioning the cover 13 in the housing 11, over the first removable storage module 12, followed by a second sub-step of keeping the cover 13 in position.

Figure 6A:
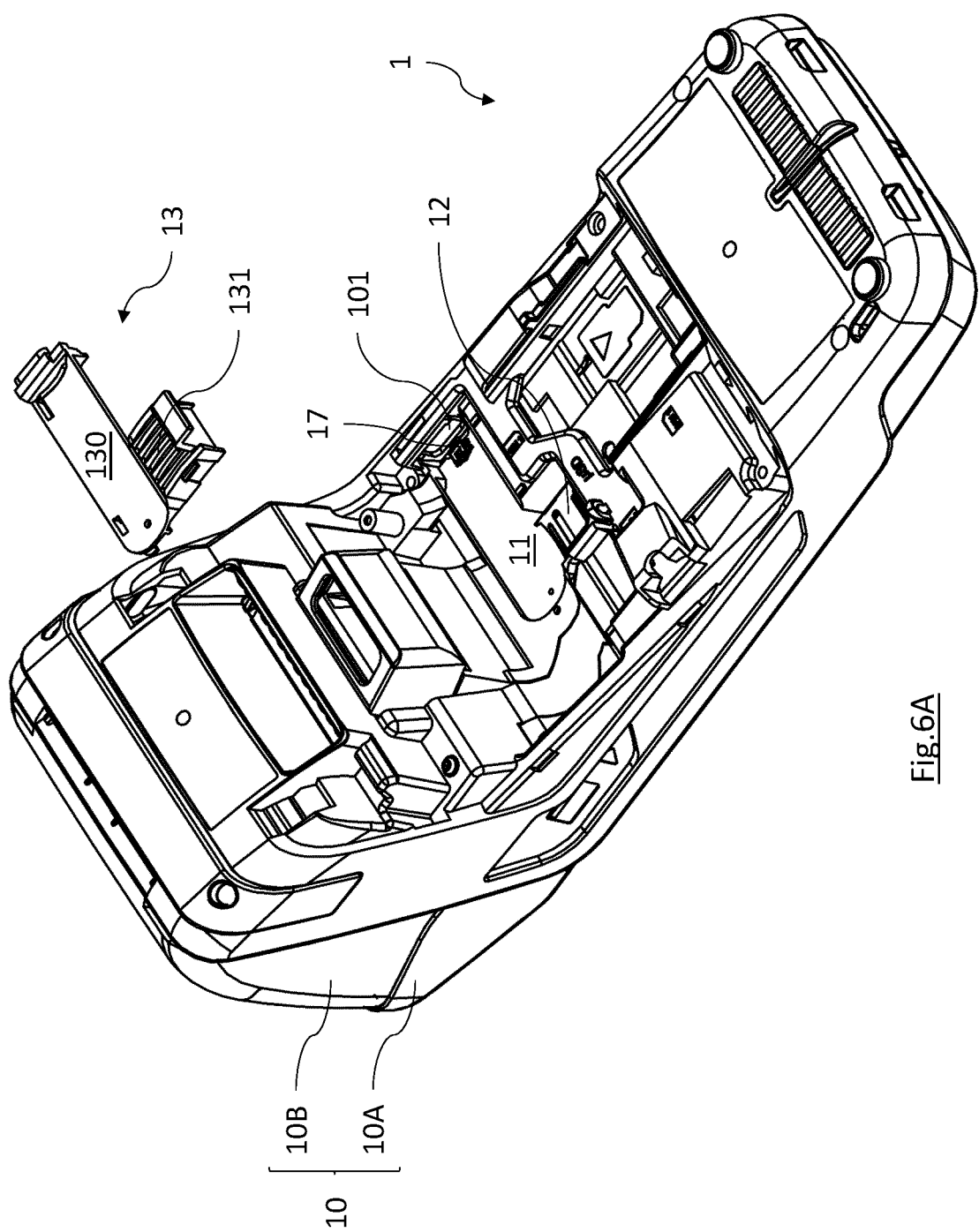
FIGS. 6A to 6D show the main steps of assembling the cover illustrated on FIGS. 3A and 3B.
Figure 6C:
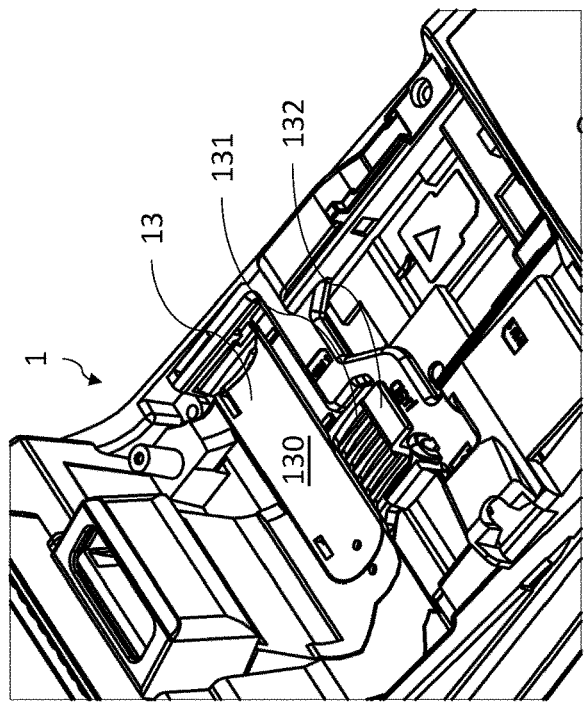
Figure 6B:
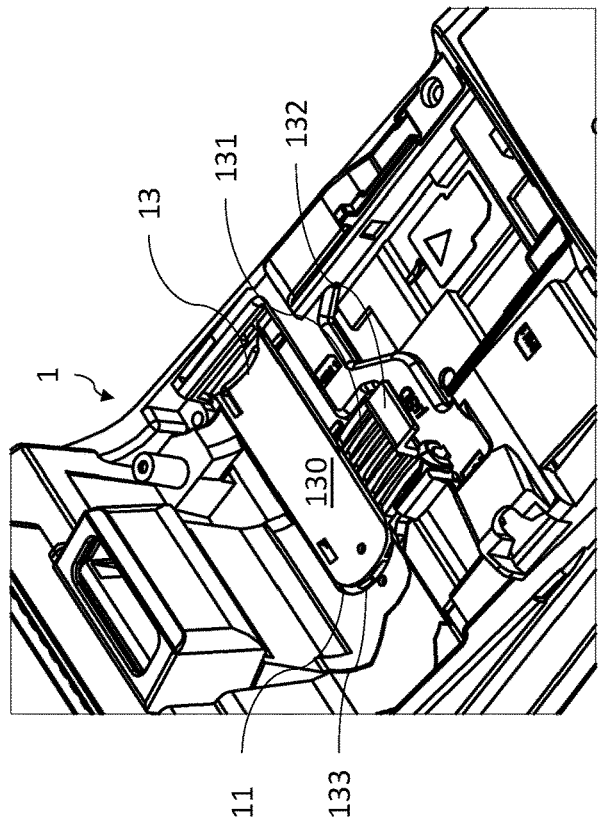

As shown referring to FIGS. 6A and 6B, to perform the first positioning sub-step, the cover 13 must be inserted inside the housing 11 so that the covering portion 131 covers the first removable storage module 12. When the cover 13 is fully inserted inside the housing 11, as shown on FIG. 6B, the cover 13 is in the closed position and prevents any access to the first removable storage module 12, and to the data it contains. In addition, after this positioning sub-step, the switching member 17 is also covered (see FIG. 6B), and therefore protected, by the cover 13.

Figure 6D:
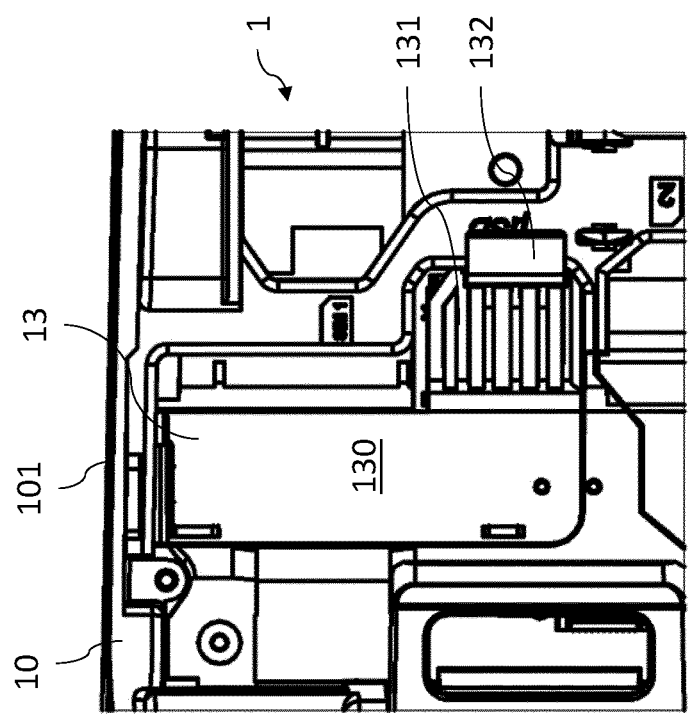

Then, as shown referring to FIGS. 6C and 6D, the second sub-step of keeping the cover in position is performed by sliding the cover 13 in the housing 11, towards the retaining means formed inside the box 10 (for example holes, not shown), until the protuberances 133 of the cover 13 are inserted into the holes. Thus, the cover 13 is kept in the closed position.

During a third step, referenced S3 and shown referring to FIG. 7, the locking member 14 is assembled to the box 10 of the terminal 1 so as to lock the cover 13 in the closed position. This third step S3 comprises two sub-steps, a first sub-step of positioning the locking member 14, followed by a second sub-step of attaching the locking member 14. To perform the first sub-step of positioning the locking member 14, in the example shown on FIG. 7, the lug 143 must be inserted into the locking opening 102 from the outside of the box 10. The locking member 14 is then turned until the attachment ring 141 and the attachment opening 103 are coaxial.

After performing this first sub-step of positioning the locking member 14, the lug 143 of the locking member 14 is against the stop 134 of the cover 13, previously inserted into the housing 11 inside the box 10 of the terminal 1. Thus, it is impossible to slide the cover 13 inside the housing 11 to extract the cover 13, since this is prevented by the lug 143. In addition, after positioning the locking member 14, the lug 143 rests partially on the edge of the locking opening 102, which avoids creating an axis of rotation (formed by the reversible attachment means) which could make it easier to extract the locking member 14.

Then, to perform the second sub-step of attaching the locking member 14, the reversible attachment means 15 must be inserted, from the outside of the box 10, through the attachment ring 141 to attach the locking member 14 to the box 10 of the terminal 1.

To do this, in the example shown, the reversible attachment means 15 comprise a frustoconical attachment bush 15A and a screw 15B. Due to the frustoconical shape of the attachment bush 15A, the more flared end (of diameter greater than the inner diameter of the attachment ring 141) keeps the locking member 14 in the locked position. The less flared end of the attachment bush 15A retains the head of the screw 15B.

More precisely, the second sub-step of attaching the locking member 14 is performed by inserting the attachment bush 15A into the attachment ring 141 of the locking member 14 then into the attachment opening 103. The attachment screw 15B is then inserted into the attachment bush 15A so that it can be screwed into a complementary tapped hole 104 formed inside the box 10. After screwing the attachment screw 15B, the attachment ring 141 is clamped between the attachment bush 15A and the side wall 10₄ of the box 10 in order to attach the locking member 14 to the box 10.

After performing this second sub-step of attaching the locking member 14, the locking member 14, and therefore the cover 13, can no longer be moved. With such an arrangement of the locking member 14, in other words on the outside of the box 10, the authorities responsible for collecting the tax debts can quickly identify a terminal 1 for which a fraudulent attempt has been made to access the first storage module 12, in particular using the authenticity device 16 described below.

Thus, during a fourth step, referenced S4 and also shown referring to FIG. 7, the attachment means 15 are partly covered by an authenticity device 16 to prevent these attachment means 15 from being accessed, and therefore removed.

In the example shown, the authenticity device 16 is a physical device, in other words a seal stamped with an imprint applied by a stamp held exclusively by the authorities responsible for collecting the tax debts. During the stamping operation, the seal, positioned inside the attachment bush 15A, is attached (by deformation) to the head of the attachment screw 15B.

After performing these four steps of assembling the removable blocking means 13, 14, 15 and the authenticity device 16, as shown on FIG. 8, the first removable storage module 12 and the data it contains are protected.

We therefore see that such arrangements and method of assembling the removable blocking means 13, 14, 15 and the authenticity device 16 guarantee the integrity of the first removable storage module 12 while allowing easy access to it by placing it in the non-secured inner chamber 101 of the terminal 1.

To access the data contained in the removable storage module 12, the four steps described above must be performed in the reverse order and kinematics, which implies destruction of the authenticity device 16.

Such a pre-requisite (destruction of the authenticity device) allows the authorities responsible for collecting the tax debts to quickly and easily identify a terminal 1 for which a fraudulent attempt has been made to access the data contained in the first removable storage module 12.

5.3 Other Characteristics and Embodiments

Figure 9:
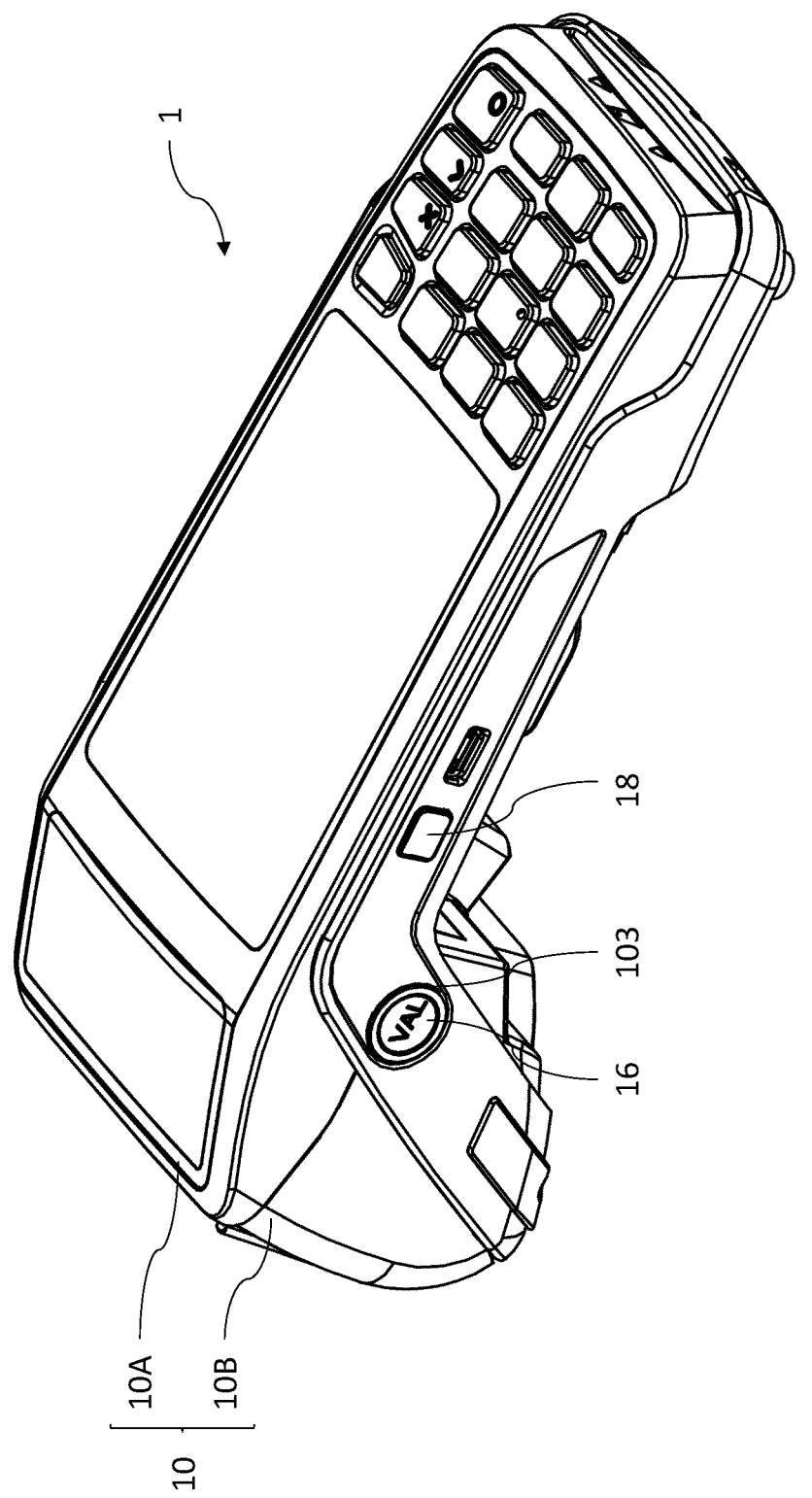
FIG. 9 is an elevated perspective view of an electronic payment terminal not equipped with the blocking means according to the proposed technique.

FIG. 9 shows an electronic payment terminal not equipped with a first storage module, a removable cover 13 and a locking member 14 as described above. The absence of such elements may in particular be justified when the national regulations of a state do not require simplified access to the tax data of the electronic payment terminal.

However, to limit the number of different architectures for electronic payment terminals, the reversible attachment means 15 (not shown on this FIG. 9) and the authenticity device 16 are nevertheless kept to respectively block the attachment opening 103 and authenticate the blocking.

In addition, the terminal 1 is reprogrammed so that the switching member 17 (not shown on this FIG. 9) can perform an operation other than that of maintenance, planned initially. To make the switching member easier to access, it is covered by a key 18 which, for example, can allow a user of the electronic payment terminal to control the camera.

We therefore see that a mobile electronic payment terminal according to the proposed technique, due to the removable nature of some elements, can comply with various laws.

In some embodiments such as those shown on FIGS. 1 to 8, the terminal contains two modules for storing data, for example tax data, related to at least one transaction made via the terminal, in other words a first removable storage module, arranged in the non-secured inner chamber and protected by access blocking means according to the proposed technique, and a second storage module, arranged in the secured inner chamber and protected by permanent blocking means.

However, in an alternative embodiment, not shown, the terminal only comprises the first removable storage module arranged in the non-secured inner chamber and protected by access blocking means according to the proposed technique.

In the embodiment described and shown previously, the locking member 14 is added to a side wall of the electronic payment terminal from the outside of the box. The locking member is then attached to this side wall by inserting reversible attachment means 15 from the outside of the box.

In an alternative embodiment, not shown, a locking member 14' is assembled inside the box, near the cover 13, already inserted inside the housing 11 over the removable storage module 12. The locking member 14' is then attached to the bottom of the lower half-shell of the box by reversible attachment means 15' and an authenticity device 16'. The authenticity device 16' is therefore located inside the box. Thus, none of the blocking means can be seen from the outside of the box (when the flap is fitted to close the lower cover of the box). Such an arrangement also removes the need for openings (for example 102, 103) formed in the walls of the box of the terminal.

In another alternative embodiment, not shown, the locking member is assembled on a wall other than a side wall. For example, the locking member can be assembled on the rear wall of the box so that the locking member cannot be seen when the terminal is in the normal use position.

According to another alternative embodiment, not shown, the locking member is assembled on several walls of the box, in particular to adapt to the positions of the components of the terminal. For example, the locking member can be assembled simultaneously on a side wall and on an upper wall of the box.

Obviously, the proposed technique is not limited to the embodiments described above and given solely by way of example. It includes various modifications, alternative shapes and other variants that those skilled in the art may consider when studying the problem in question and in particular all combinations of the various operating modes described previously, which can be taken alone or in combination.

The invention claimed is:

1. An electronic payment terminal comprising a box having a housing inside which a first removable storage module for storing data related to at least one transaction made via said terminal is arranged, said terminal further having removable blocking elements for blocking access to said first removable storage module and an authenticity device covering at least one portion of said removable blocking elements for blocking access to said first removable storage module, wherein said box defines an inner space comprising at least one secured inner chamber, protected by intrusion detection elements, and one non-secured inner chamber, and in that said housing is located in said non-secured inner chamber.

2. The electronic payment terminal according to claim 1, characterised in that said removable blocking elements comprise:
   a removable cover for closing said housing to prevent access to said removable storage module, and
   a removable locking member configured to lock said removable cover in a closed position, said locking member being attached to said box by reversible attachment elements.

3. The electronic payment terminal according to claim 2, characterised in that said authenticity device covers at least one portion of said reversible attachment elements for attaching said locking member to said box.

4. The electronic payment terminal according to claim 1, characterised in that it comprises a switching member for switching an operation of said terminal, and in that said removable blocking elements block access to said switching member.

5. The electronic payment terminal according to claim 1, characterised in that at least one of the removable blocking elements is added to an outside of said box, and in that said authenticity device covers at least one portion of said at least one of the removable blocking elements.

6. The electronic payment terminal according to claim 1, characterised in that said box defines an inner space, and in that said removable blocking elements and said authenticity device are arranged in said inner space.

7. The electronic payment terminal according to claim 1, characterised in that said authenticity device is a mechanical device such as a seal stamped with a special imprint.

* * * * *